United States Patent [19]

Maddi

[11] Patent Number: 4,641,989
[45] Date of Patent: Feb. 10, 1987

[54] PIPE HANGER EXTENSION CLIP
[75] Inventor: Frank J. Maddi, Somerset, N.J.
[73] Assignee: Joule' Inc., Orange, N.J.
[21] Appl. No.: 828,907
[22] Filed: Feb. 13, 1986
[51] Int. Cl.⁴ .............................................. F16D 1/00
[52] U.S. Cl. .................................. 403/302; 403/118; 403/305
[58] Field of Search ............... 403/302, 118, 305, 309, 403/313; 248/327; 411/918; 29/172, 175 R, 438

[56] References Cited

U.S. PATENT DOCUMENTS

| 2,246,750 | 6/1941 | Murphy | 403/313 X |
| 3,174,384 | 3/1965 | Vanni | 411/918 X |
| 3,406,734 | 10/1968 | Munse | 411/918 X |
| 3,726,179 | 4/1973 | Friese, Jr. | 411/918 X |

Primary Examiner—Andrew V. Kundrat
Attorney, Agent, or Firm—Stoll, Wilkie, Previto & Hoffman

[57] ABSTRACT

An extension clip is disclosed for attaching threaded end portions to a plain rod. The clip is cut from flat metal plate and is shaped into a hollow form having clinch-type ears at one end for gripping the plain rod and inwardly bent tabs at its opposite end to form means for threadedly engaging threaded rod end portions. Intermediate to the clinch ears and the thread forming tabs additional tabs are provided which act as stops for determining the position of the plain rod and the threaded rod ends in the clip.

10 Claims, 6 Drawing Figures

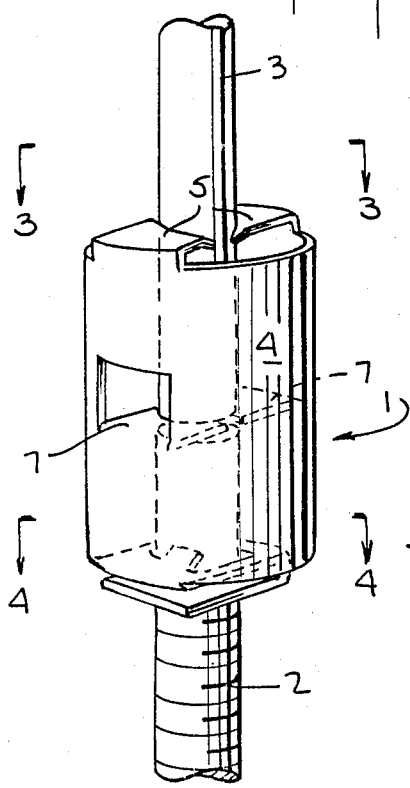
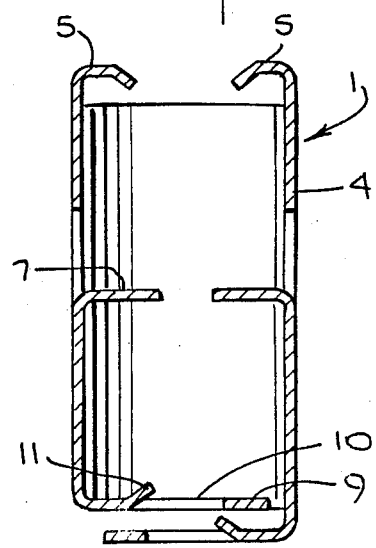
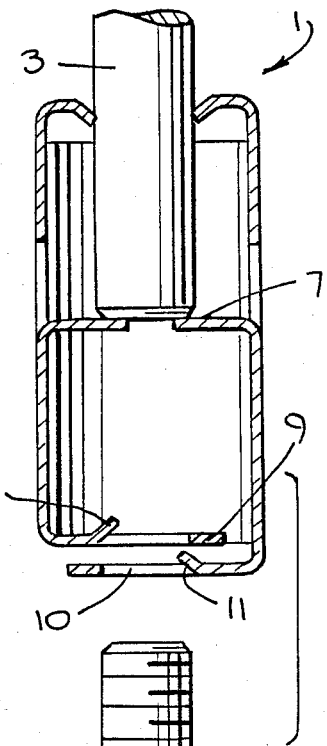
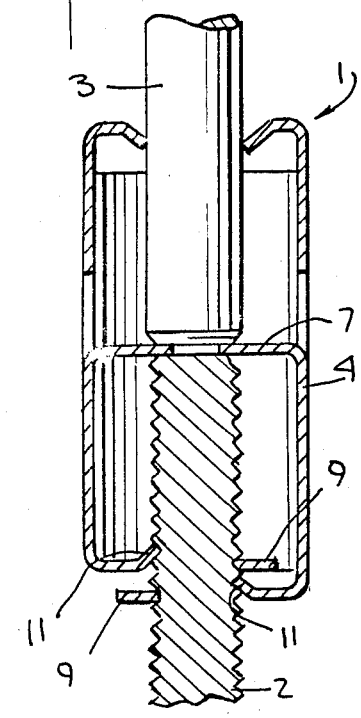
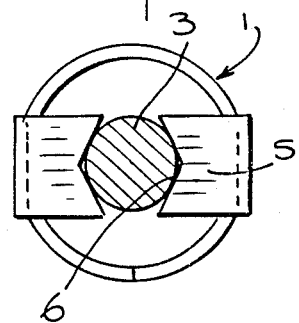
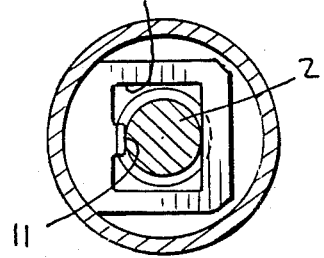

PIPE HANGER EXTENSION CLIP

BACKGROUND OF THE INVENTION

The present invention relates to a pipe hanger extension clip and more particularly to such a clip for attaching a threaded rod to a plain rod thereby minimizing the amount of rod threading required or the amount of fully threaded rod needed for use for pipe hangers or similar uses where opposite ends of an elongated rod require threading.

The present invention will be described, by way of example, for use in pipe installations where pipe hangers are used for supporting the piping. It is clear that the clip and the related rods may be used for a variety of other uses where the invention provides for substantial savings.

In hanging pipe along ceilings, for example, it is common practice to support the pipe using hangers consisting of one or more rods which are threadedly coupled at their top to a top hanger and at their bottom to the pipe cleaver hanger. This present practice uses appropriate lengths of threaded rod with the rods being threaded as installed or being completely threaded from top to bottom.

The present invention provides a novel clip, which is used to effectively attach short lengths of threaded rod to one or both ends of a plain rod providing sufficient thread for the desired threaded connections. The short attached threaded sections may be mass produced in suitable lengths such as six inches or so and supplied to the installation site in convenient amounts at minimal expense. At the rod installation, the clip of the invention is used to snap the threaded end sections to plain rods which are easily but in advance or at the site to the desired length less the length of the attached end threaded portions.

In order to make this procedure practical, the clip itself must necessarily be inexpensive, effective, and easy to manufacture.

The clip of the present invention meets this criteria by being relatively simple and effective and by being easily formed by cutting and bending operations from steel plate, which may be heat treated to obtain the necessary strength.

Accordingly, an object of the present invention is to provide improved and simplified method of hanging pipes on rod hangers.

Another object of the present invention is to provide a clip means for facilitating pipe hanging using rods.

Another object of the present invention is to provide a novel, effective and simplified clip for attaching threaded ends to rods.

Another object of the present invention is to provide an improved rod extension clip formed from plate material by simply cutting and bending operations.

Other and further objects of the present invention will become apparent upon an understanding of the illustrative embodiments about to be described, or will be indicated in the appended claims, and various advantages not referred to herein will occur to one skilled in the art upon employment of the invention in practice.

BRIEF DESCRIPTION OF THE DRAWINGS

A preferred embodiment of the invention has been chosen for purposes of illustration and description and is shown in the accompanying drawings, forming a part of the specification, wherein:

FIG. 1 is a perspective view of the clip of the invention attaching a threaded end portion to a plain rod.

FIG. 2 is a vertical sectional view of the clip of FIG. 1.

FIGS. 3 and 4 are cross-sectional views of the assembly of FIG. 1 taken along line 3—3 and 4—4 respectively on FIG. 1.

FIGS. 5 and 6 are side elevational views in section illustrating the attachment of a threaded end section to a plain rod using the clip of the invention.

As illustrated in FIG. 1, the clip 1 attaches a threaded end 2 to a plain rod 3. The clip 1 has a generally cylindrical cross-section, being bent from a plate of appropriate dimension and having been blanked to provide a number of inwardly directed projections for providing the attaching actions. The generally cylindrical body 4 of the clip 1 has at its top a pair of bent clinch type ears 5 extending inwardly at generally right angles to the body 4 with "V" shaped end cut-outs 6 (FIG. 3) proportioned to tightly grip the smooth rod 3 after its insertion. As illustrated in FIG. 2, a slight downward incline on the ears 5 provides for a ratchet type gripping action between the ears 5 and the smooth surface of the inserted rod 3. The rod 3 is inserted past the ears 5 to about inwardly directed tabs 7 cut from the clip body 4 and bent radially inwardly to the position illustrated in the drawings. The tabs 7 act to position both the rod 3 and the threaded end 2 after they are inserted into the clip 1.

The bottom of the clip 3 has inwardly bent tabs 9 with a punched out quadrant 10 with a single tooth 11 to act as a thread engaging means permitting the threaded end 2 to be turned upwardly into the clip 1 to the position illustrated in FIGS. 1 and 6. The vertical distance between the tabs 9 is adjusted to provide a threading or locking action for the particular size of threaded end and the pitch of the thread used.

In use, the appropriate size rod 3 for the pipe being hung is selected along with an appropriately proportioned clip 1. The distance from the top pipe hanger to the pipe clevis hanger is measured and about 6 inches is deducted. The plain rod 3 is now cut to this length and a clip 1 is fastened onto opposite ends of the plain rod 3. Thereafter, a threaded rod 2 of about 6 inches or so long is turned into each clip 1 through the thread engaging end, thereby providing a hanger rod for use in the normal manner. This eliminates the necessity for threading the opposite ends of the rod in the field or on the installation site, or the alternative of providing more expensive fully threaded rod. Additionally, no deburring is necessary when threading rods. The lengths of the threaded ends 2 clipped to the plain rod 3 are chosen to give a substantial degree of adjustment in positioning the pipe hanger as desired.

It will be seen that a novel extension clip has been provided for attaching threaded end portions to plain rods. The clips are manufactured from heat treated steel by being cut and bent from steel sheets or plates whereby an effective, easily manufactured, and relatively inexpensive clip is provided. The use of these clips eliminates the necessity for a more difficult threading operation of rod ends or for the use of fully threaded rods where the full thread is not required. The use of the clips also eliminates the deburring normally necessary when threading rods during their installation. The threaded rod ends are easily manufactured upon high speed automatic threading machines.

As various changes may be made in the form, construction and arrangement of the invention and without departing from the spirit and scope of the invention, and without sacrificing any of its advantages, it is to be understood that all matter herein is to be interpreted as illustrative and not in a limiting sense.

Having thus described my invention, I claim:

1. An improved extension clip for connecting a smooth rod to a threaded rod comprising:
   a hollow body with rod engaging clinch ears positioned at one end of said body,
   thread forming means at an opposite end of said body; and
   stop means positioned within the body intermediate said clinch ears and said thread forming means for positioning said smooth rod and said threaded rod;
   said body having a pair of said clinch ears; and
   each clinch ear having an angled end portion including a V-notch.

2. The extension clip as claimed in claim 1 in which said stop means comprises a pair of inwardly bent tabs.

3. The extension clip as claimed in claim 1 in which said thread forming means comprises a pair of inwardly bent and apertured tabs each having a thread engaging tooth thereon.

4. An improved extension clip for connecting a smooth rod to a threaded rod-end comprising:
   a hollow body;
   a pair of rod engaging clinch ear tabs formed at one end of said body;
   a pair of thread forming tabs formed on the opposite end of said body; and
   stop tab means extending into the clip body intermediate said clinch ears and said thread tabs for axially positioning said rod and said rod-end within said clip.

5. The extension clip as claimed in claim 4 further comprising each clinch ear having an angled inner end including a V-notch.

6. The extension clip as claimed in claim 4 in which said stop means comprises a pair of inwardly bent tabs.

7. The extension clip as claimed in claim 4 in which said thread forming tabs have a rod receiving aperture therein with a thread engaging tooth.

8. An improved method of forming a threaded rod end comprising the steps of:
   providing a smooth rod cut to a length shorter than the completed threaded rod;
   providing a relatively short threaded rod of approximately the same diameter as the smooth rod and clipping the threaded rod to the smooth rod employing a hollow extension clip;
   attaching said extension clip to the smooth rod by clinching it to the smooth rod and attaching the threaded rod to said extension clip by threading it thereto.

9. The method as claimed in claim 8 which comprises using fixed stop to position the smooth rod and the threaded rod within the extension clip.

10. The method as claimed in claim 8 which further comprises clipping threaded rods to both ends of the smooth rod.

* * * * *